(12) United States Patent
Agarwal et al.

(10) Patent No.: US 11,750,498 B2
(45) Date of Patent: Sep. 5, 2023

(54) GUARANTYING SLA THRU EDGE CLOUD PATH ORCHESTRATION

(71) Applicant: Microsoft Technology Licensing, LLC, Redmond, WA (US)

(72) Inventors: Sharad Agarwal, Seattle, WA (US); Ryan Andrew Beckett, Redmond, WA (US); Abhishek Udupa, Bellevue, WA (US); Rachee Singh, Redmond, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 17/376,653

(22) Filed: Jul. 15, 2021

(65) Prior Publication Data
US 2023/0018685 A1    Jan. 19, 2023

(51) Int. Cl.
*H04L 45/02* (2022.01)
*H04L 12/28* (2006.01)
(Continued)

(52) U.S. Cl.
CPC .......... *H04L 45/04* (2013.01); *H04L 12/2869* (2013.01); *H04L 45/123* (2013.01);
(Continued)

(58) Field of Classification Search
CPC ... H04L 45/02; H04L 45/037; H04L 45/0377; H04L 45/04; H04L 12/2854;
(Continued)

(56) References Cited

U.S. PATENT DOCUMENTS 6,993,593 B2 * 1/2006 Iwata .................... H04L 45/302
370/254
11,381,474 B1 * 7/2022 Kumar ................ H04L 41/0896
(Continued)

FOREIGN PATENT DOCUMENTS

EP        2892183 A1 * 7/2015 ......... H04L 12/4633

OTHER PUBLICATIONS

"International Search Report and Written Opinion Issued in PCT Application No. PCT/US22/030986", dated Aug. 3, 2022, 15 Pages.
(Continued)

*Primary Examiner* — Warner Wong
(74) *Attorney, Agent, or Firm* — ArentFox Schiff LLP

(57) ABSTRACT

The present application relates to communications between a partner network and a wide area network (WAN) via the Internet. Although Internet service providers may act as autonomous systems, the WAN may control routing from the partner network by advertising unicast border gateway protocol (BGP) address prefixes for a plurality of front-end devices in the WAN. An agent in the partner network measures a plurality of paths to a service within the WAN. Each of the plurality of paths is associated with one of the plurality of front-end devices and a respective unicast BGP address prefix. The WAN selects a path within the WAN for the service. The WAN exports a routing rule to the agent.
(Continued)

The agent forwards data packets for the service to the respective BGP address prefix via the Internet. The WAN receives data packets for the service of the partner network at the selected device.

22 Claims, 9 Drawing Sheets

(51) Int. Cl.
  *H04L 45/12* (2022.01)
  *H04L 45/302* (2022.01)
  *H04L 69/329* (2022.01)
  *H04L 45/64* (2022.01)
  *H04L 45/00* (2022.01)
  *H04L 45/76* (2022.01)

(52) U.S. Cl.
  CPC .......... *H04L 45/306* (2013.01); *H04L 69/329* (2013.01); *H04L 45/64* (2013.01); *H04L 45/70* (2013.01); *H04L 45/76* (2022.05)

(58) Field of Classification Search
  CPC . H04L 12/2856; H04L 12/2869; H04L 45/12; H04L 45/123; H04L 45/302; H04L 45/306; H04L 45/3065; H04L 69/322; H04L 69/329; H04L 45/00; H04L 45/64; H04L 45/645; H04L 2012/5618; H04L 12/66; H04L 65/10; H04L 65/1013; H04L 69/08; H04L 69/085; H04L 45/42; H04L 45/70; H04L 45/76
  See application file for complete search history.

(56) References Cited

U.S. PATENT DOCUMENTS

| | | | | |
|---|---|---|---|---|
| 2004/0223491 | A1* | 11/2004 | Levy-Abegnoli | H04L 45/02 370/389 |
| 2006/0140136 | A1* | 6/2006 | Filsfils | H04L 45/28 370/255 |
| 2006/0171320 | A1* | 8/2006 | Vasseur | H04L 45/50 370/248 |
| 2006/0176820 | A1* | 8/2006 | Vasseur | H04L 45/32 370/254 |
| 2006/0200579 | A1* | 9/2006 | Vasseur | H04L 45/42 709/238 |
| 2016/0294677 | A1* | 10/2016 | Kazerani | H04L 45/22 |
| 2018/0062875 | A1* | 3/2018 | Tumuluru | H04L 43/12 |
| 2019/0132241 | A1 | 5/2019 | Vattem et al. | |
| 2019/0386918 | A1* | 12/2019 | Iyer | H04L 43/0829 |
| 2020/0162365 | A1* | 5/2020 | Liu | H04L 43/0894 |
| 2020/0177503 | A1 | 6/2020 | Hooda et al. | |
| 2020/0304411 | A1* | 9/2020 | Tang | H04L 45/00 |
| 2020/0322264 | A1* | 10/2020 | Clad | H04L 45/3065 |
| 2020/0389796 | A1 | 12/2020 | Olofsson et al. | |
| 2021/0234728 | A1* | 7/2021 | Cidon | H04L 41/0894 |
| 2021/0258249 | A1* | 8/2021 | Torvi | H04L 45/04 |
| 2022/0103466 | A1* | 3/2022 | Cai | H04L 45/22 |
| 2022/0247685 | A1* | 8/2022 | Means | H04L 43/0894 |
| 2023/0013211 | A1* | 1/2023 | Agarwal | H04L 12/46 |

OTHER PUBLICATIONS

Phemius, et al., "DISCO: Distributed Multi-domain SDN Controllers", In Repository of arxiv.org/abs/1308.6138v1, Aug. 28, 2013, 8 Pages.

* cited by examiner

GUARANTYING SLA THRU EDGE CLOUD PATH ORCHESTRATION

BACKGROUND

Wide area networks may include computing resources spread across a geographic region and connected via communication links such as fiber optic cables. The size of wide area networks may vary greatly from a small city to a global network. For example, a WAN may connect multiple offices of an enterprise, the customers of a regional telecommunications operator, or a global enterprise. The computing resources and connections within a WAN may be owned and controlled by the WAN operator.

A partner network may obtain services from the WAN. For example, a partner network may be an enterprise network and the WAN may host services for users of the enterprise network. The partner network may be connected to the WAN via the Internet. A path between the partner network and the WAN may include one or more Internet Service Providers (ISPs). In general, traffic traversing the Internet may be routed on a lowest cost basis. Accordingly, neither the partner network nor the WAN may have significant control of routing decisions between the partner network and the WAN.

One attempt to give a network greater control over routing decisions is software defined wide area networking (SD-WAN). SD-WAN may control routing decisions within an enterprise network. An SD-WAN appliance, which may be referred to as an SD-WAN edge is a physical or virtual network function that is placed at an organization's branch/regional/central office site, data center, and in public or private cloud platforms. The SD-WAN edge may perform classification of traffic and forwarding based on availability of a route to another SD-WAN edge. In the context of cloud services hosted by the WAN operator, however, an SD-WAN may not have information or ability to select routes over the Internet to the WAN hosting a cloud service.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, an apparatus for managing connectivity between a partner network and a wide-area network (WAN) is provided. The apparatus includes a memory storing one or more instructions for managing the WAN and at least one processor coupled to the memory and configured to execute the instructions. The at least one processor is configured to advertise a plurality of unicast border gateway protocol address prefixes for a plurality of front-end devices of the WAN. The at least one processor is configured to select a path within the WAN for a service for users of the partner network, the path including a selected device of the plurality of front-end devices. The at least one processor is configured to export a routing rule to an agent within the partner network, the routing rule specifying a unicast address prefix for the selected device. The at least one processor is configured to configure the selected device to receive data packets for the service of the partner network.

In another example, a method of managing connectivity between a partner network and a wide-area network WAN is provided. The method includes advertising a plurality of unicast border gateway protocol address prefixes for a plurality of front-end devices of the WAN. The method includes selecting a path within the WAN for a service for users of the partner network, the path including a selected device of the plurality of front-end devices. The method includes exporting a routing rule to an agent within the partner network, the routing rule specifying a unicast address prefix for the selected device. The method includes receiving data packets for the service of the partner network at the selected device.

In some implementations, each of the plurality of unicast border gateway protocol address prefixes identify a respective front-end device at a point of presence (POP) or peering connection between the WAN and an Internet service provider (ISP).

In some implementations, selecting the path within the WAN for the service includes determining a measurement of a plurality of paths to the service within the WAN from the agent, each of the plurality of paths associated with one of the plurality of front-end devices of the WAN.

In some implementations, determining the measurement of a plurality of paths to the service within the WAN from the agent includes receiving a measurement for a portion of each of the plurality of paths between the partner network and the respective front-end device and adding a measurement within the WAN from the front-end device to the service.

In some implementations, selecting the path within the WAN is based on a load on the path.

In some implementations, the agent within the partner network is located at a software defined wide area networking (SD-WAN) appliance.

In some implementations, the agent within the partner network is an application controlled by the WAN.

In some implementations, advertising the plurality of unicast border gateway protocol address prefixes for the plurality of front-end devices of the WAN includes selecting the plurality of front-end devices of the WAN based on a network topology of the WAN.

In some implementations, receiving the data packets for the service of the partner network at the selected device includes decapsulating, at the selected device, packets for the service from packets addressed to the unicast address prefix for the selected device based on the routing rule.

In some implementations, receiving the data packets for the service of the partner network at the selected device includes forwarding the data packets addressed to the unicast address prefix for the selected device to the service based on an original address within the WAN according to the routing rule.

In some implementations, the method includes advertising a common anycast border gateway protocol address prefix for the plurality of front-end devices of the WAN. The common anycast border gateway protocol address prefix may be less specific than the plurality of unicast border gateway protocol address prefixes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
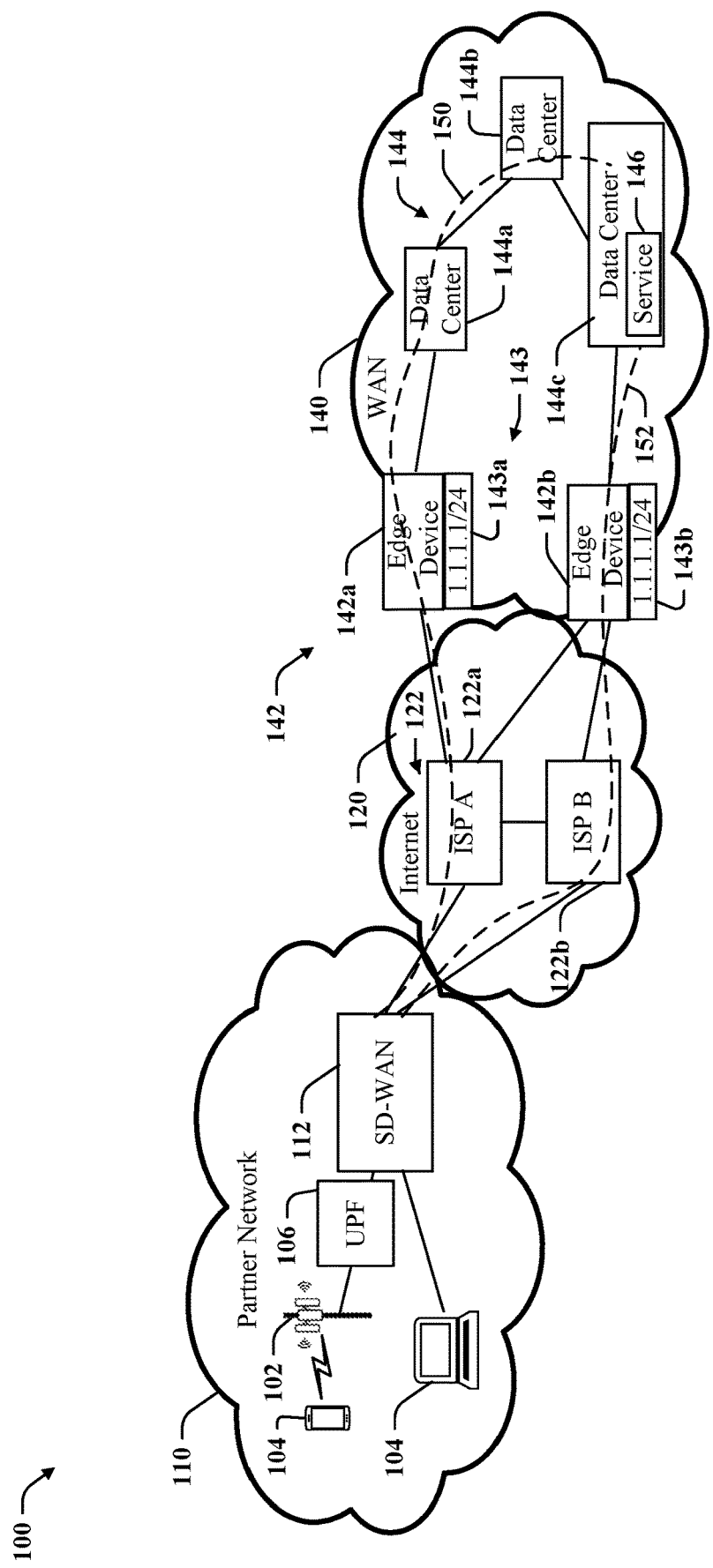
FIG. 1 is a diagram of an example of an architecture for connecting a partner network to a wide area network (WAN), in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to selection of a path between a partner network and a wide area network (WAN). In an aspect, the WAN includes a plurality of front-end devices that are connected to internet service providers (ISPs), for example, at peering locations such as points of presence (POPs). Generally, traffic for services hosted in the WAN may ingress the WAN at any of the front-end devices. Conventionally, the front-end devices advertise their presence to the ISPs using border gateway protocol (BGP) anycast announcements. Such announcements associate the same internet protocol (IP) address and prefix with each of the front-end devices. Accordingly, traffic for the services hosted in the WAN may be forwarded by the ISPs to any of the front-end devices.

In an aspect, communication properties (e.g., quality of service (QoS) or quality of experience (QoE)) between the partner network and a service hosted in the WAN may be improved by selecting at least a portion of the path between the partner network and the service. For example, traffic carried by different ISPs may have different characteristics in terms of latency, jitter, etc. Additionally, paths within the WAN from the front-end devices to the service may have different characteristics. However, because ingress traffic may conventionally arrive at any of the front-end devices, the WAN may have limited options for routing traffic to the service.

In an aspect, the present disclosure provides for selection of a path between the partner network and the WAN by advertising different BGP address prefixes for different front-end devices of the WAN. For instance, the WAN may advertise unicast BGP address prefixes for a plurality of front-end devices. Further, the WAN may implement an agent within the partner network (e.g., at an SD-WAN appliance), that measures paths including different front-end devices of the WAN. Accordingly, the WAN may identify paths from the partner network via the Internet to services hosted in the WAN that have better characteristics. The WAN may then control the agent to route traffic to the service along a selected path. For instance, the agent may tunnel traffic to the unicast BGP address prefix associated with selected path. Thus, the WAN may improve a connection between the partner network and the WAN via the Internet by selecting a specific path for traffic associated with a service.

Figure 2:
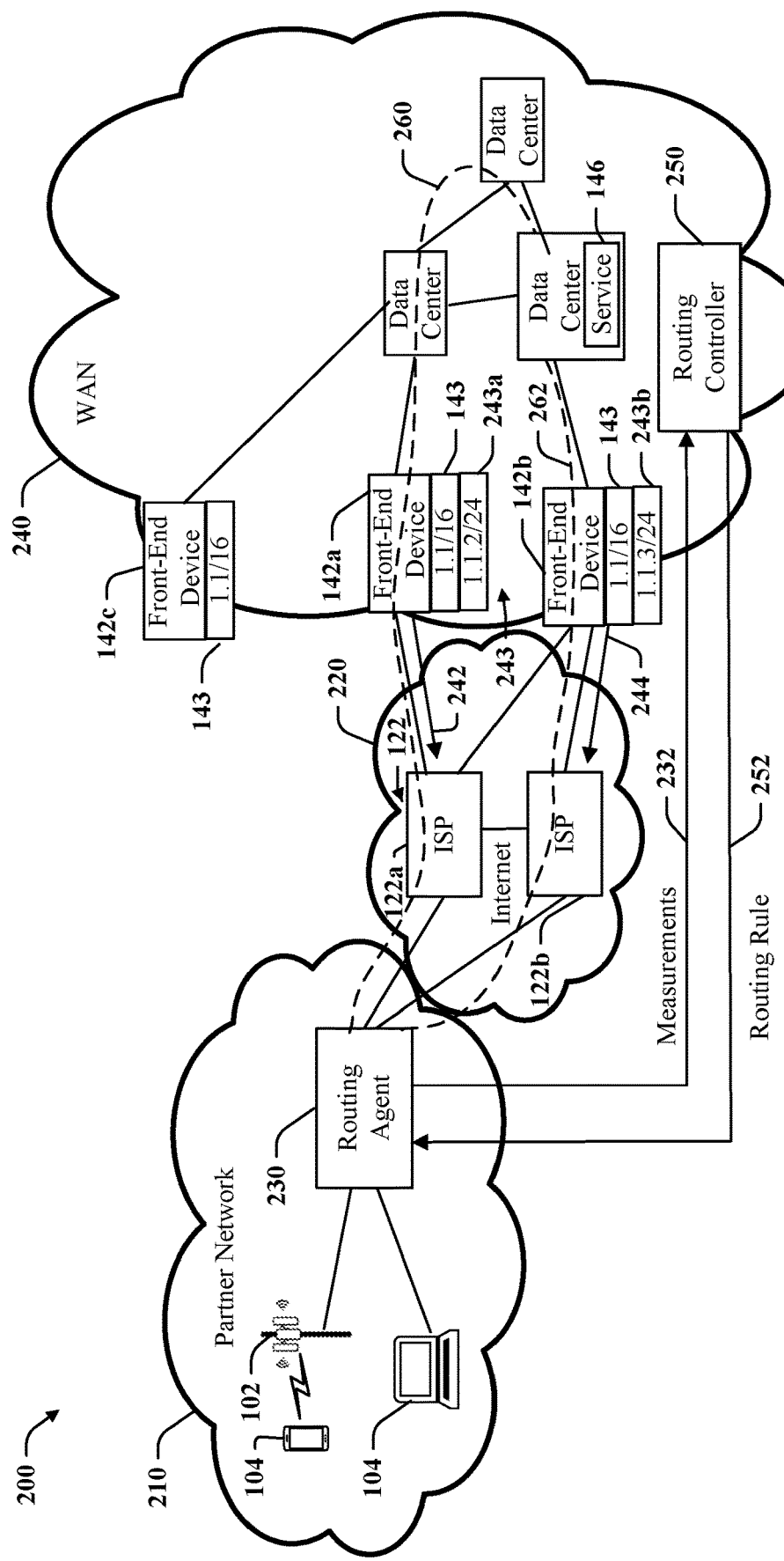
FIG. 2 is a diagram of an example of an architecture for connecting a partner network to a WAN via a selected path, in accordance with aspects described herein.
Figure 3:
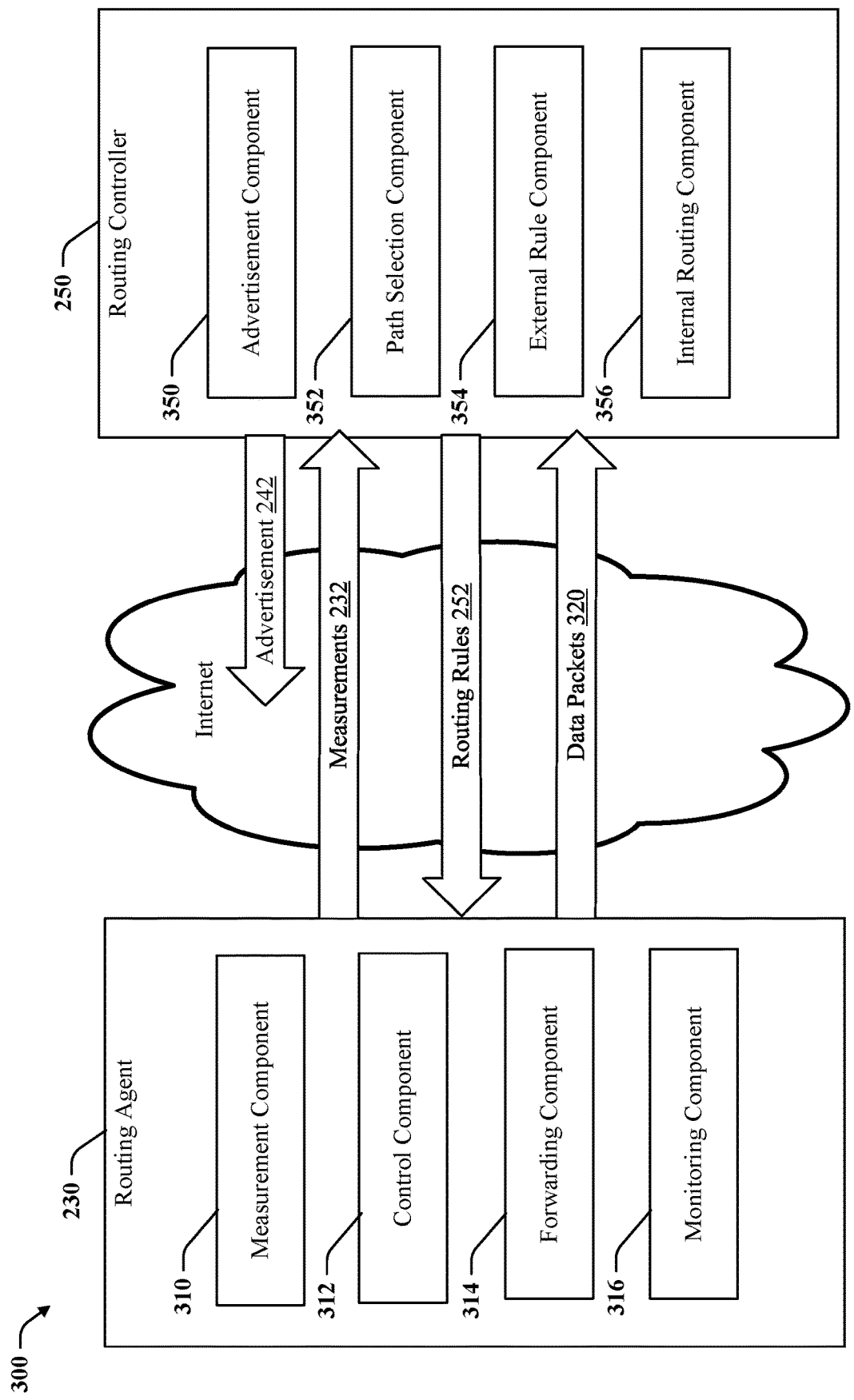
FIG. 3 is a diagram of example components of a routing agent and routing controller and communications there between, in accordance with aspects described herein.
Figure 4:
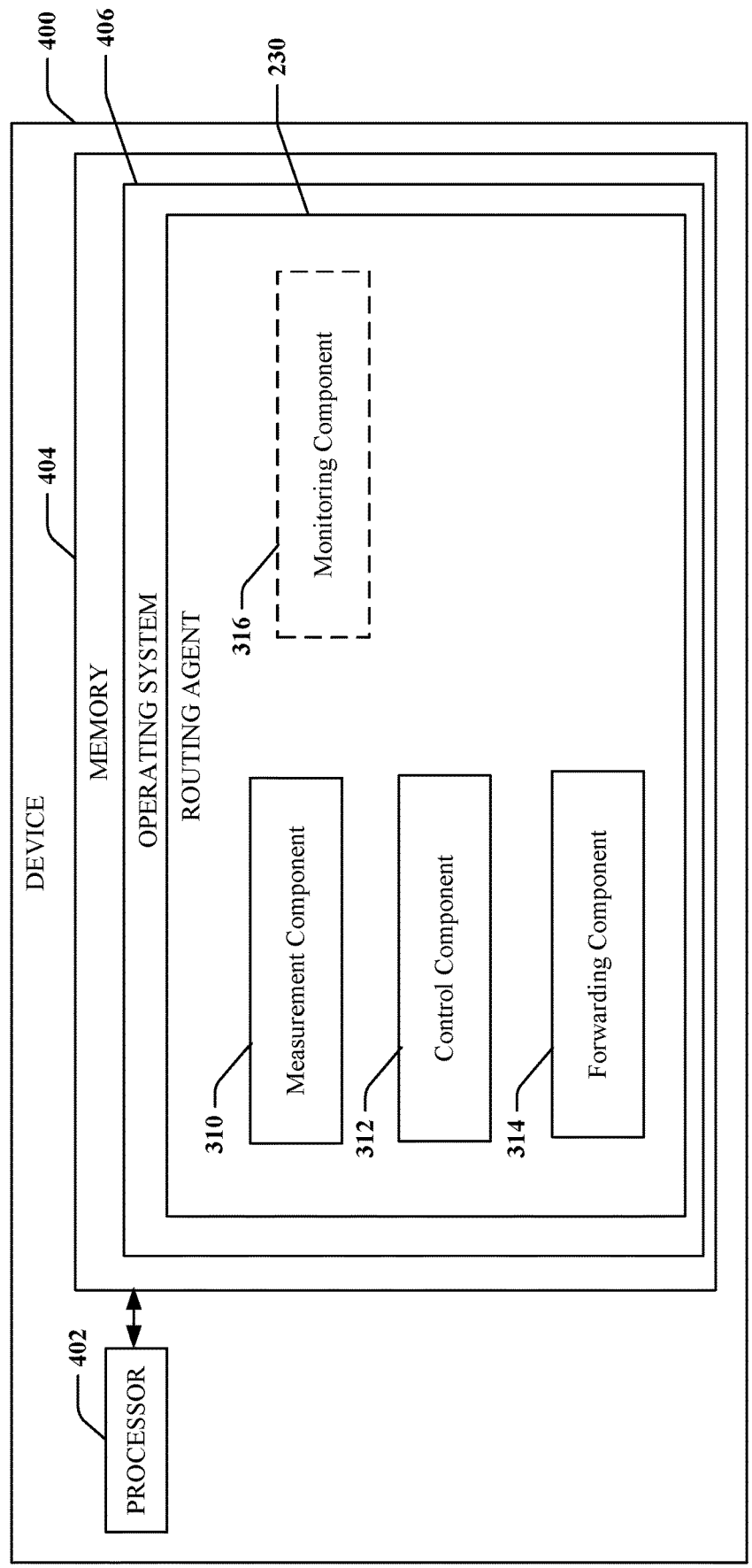
FIG. 4 is a schematic diagram of an example of a device for routing traffic from a partner network to a WAN, in accordance with aspects described herein.

Turning now to FIGS. 1-9, examples are depicted with reference to one or more components and one or more methods that may perform the actions or operations described herein, where components and/or actions/operations in dashed line may be optional. Although the operations described below in FIG. 4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a conceptual diagram 100 of an example of an architecture for connectivity between a partner network 110 and a wide area network (WAN) 140 via the internet 120. The WAN 140 may host a service 146 for the partner network 110.

The partner network 110 may include any computer network that may connect to the WAN 140 via the Internet 120. For example, the partner network may include an enterprise network, which may itself be a WAN connecting multiple locations of the enterprise. As another example, the partner network 110 may include a radio access network (RAN). For example, the partner network 110 may include a user device 104 that wirelessly connects to a base station 102. The partner network 110 may include a user plane function (UPF) 106 that handles user traffic to a from a core network. In some implementations, the service 146 may include a core network function.

In some cases, the partner network may utilize a software defined WAN (SD-WAN) appliance 112. For example, the SD-WAN appliance 112 may be an SD-WAN edge device that controls routing to other SD-WAN edge devices and to the Internet 120 and/or WAN 140. In some implementations, an SD-WAN appliance may include software executed on a network device such as a router or server. For instance, an SD-WAN appliance 112 may be provided by a third party and executed on a device of the partner network 110.

The Internet 120 may be a network of internet service providers (ISPs) 122 connected according to the Internet protocol. For simplicity, a first ISP 122*a* and a second ISP 122*b* are illustrated, but it should be understood that the Internet 120 may include numerous ISPs connected directly or indirectly. The ISPs may also be referred to as autonomous systems (AS) and be associated with an autonomous system number (ASN), which may be used for routing according to a border gateway protocol (BGP).

The WAN 140 may include computing resources spread across a geographic region and connected via communication links such as fiber optic cables. For example, the WAN 140 may include front-end devices 142 and data centers 144. The front-end devices 142 may be referred to as edge devices and may include routers and/or servers, for example. The front-end devices 142 may be located at a point of presence (POP) and have a peering connection to one or more ISPs 122. A peering connection may be associated with a BGP IP address prefix 143. For example, each of the front-end devices 142 may use BGP anycast announcements to establish the same IP address prefix (1.1.1.1/24). Accordingly, the ISPs 122 may forward traffic to the WAN 140 via the peering connections. The data centers 144 may include computing resources (e.g., servers) within the WAN 140. For example, in a cloud computing scenario, the WAN 140 may host a service 146 (e.g., an application) at one or more of the data centers 144. The data centers 144 may also include routers configured to forward traffic to front-end devices 142 and/or other data centers 144. In some implementations, the service 146 may be a transport service associated with an egress point of the WAN 140, which may be another front-end device 142.

As illustrated in FIG. 1, traffic for the service 146 may take different paths from the partner network 110 to the WAN 140. For example, a first path 150 may travel from the SD-WAN appliance 112 to the first ISP 122*a*, to the front-end device 142*a*, and data centers 144*a*, 144*b*, 144*c*. As another example, a second path 152 may travel from the SD-WAN appliance 112 to the second ISP 122*b*, to the front-end device 142*b*, and to the data center 144*c*. In some cases, the SD-WAN appliance 112 may provide limited selection of between path 150 and 152, but such selection may only apply to selection of an initial ISP 122 because the initial ISP 122 may choose to forward traffic to another ISP rather than directly to the WAN 140. Additionally, as illustrated, path selection by the WAN 140 is limited because traffic may arrive at any front-end device 142.

FIG. 2 is a conceptual diagram 200 of an example of an architecture for connectivity between a partner network 210 and a WAN 240 using a routing agent 230 within the partner network 210 to direct traffic to a selected front-end device of the WAN 240 via the Internet 220. The WAN 240 includes a routing controller 250 that communicates with the routing agent 230 and provides routing policies to the routing controller 250.

The partner network 210 may be similar to the partner network 110 and include user device 104. In the case of a RAN, the partner network 210 may include the base station 102 and UPF 106. The partner network 210 may include the routing agent 230. In some implementations, the routing agent 230 may be implemented on a SD-WAN appliance 112. In some implementations, the routing agent 230 may be implemented on other devices in the partner network 210 including, for example, a user device 104.

The WAN 240 may be similar to the WAN 140 and include front-end devices 142 and data centers 144. In an aspect, one or more of the front-end devices 142 may advertise a unicast BGP address prefix for the front-end device 142. For example, the front-end device 142*a* may send an advertisement 242 to the ISP 122*a*. The advertisement 242 may advertise the BGP address prefix 243*a* (e.g., 1.1.2/24) for the front-end device 142*a*. Because the advertisement 242 is a BGP unicast announcement, the ISP 122*a* may forward traffic for the specified address prefix 243*a* to the specific front-end device 142*a*. The ISP 122*a* may propagate the advertisement 242 to establish paths to the front-end device 142*a* through other ISPs 122. Similarly, the front-end device 142*b* may send an advertisement 244 to the ISP 122*b* advertising a BGP address prefix 243*b* (e.g., 1.1.3/24) for the front-end device 142*b*. In an aspect, the routing controller 250 may control the front-end devices 142 to advertise a plurality of unicast BGP address prefixes for a plurality of front-end devices 142 of the WAN 240. Accordingly, the routing controller 250 may establish paths through the Internet 220 to specific front-end devices 142.

In an aspect, the front-end devices 142 may also advertise an anycast BGP prefix 143 that is common to the front-end devices 142. The anycast BGP prefix 143 may be less specific (e.g., 1.1/16) than the unicast BGP prefixes 243. According to BGP, the ISPs 122 may select the more specific routes for the unicast BGP prefixes 243 if available. The anycast BGP prefix 143 may gracefully handle certain types of failure. For example, if multiple front-end devices are associated with the same anycast BGP prefix 143 and one of the front-end devices associated with a unicast BGP prefix 243 becomes unavailable, an ISP 122 may select a different route to the anycast BGP prefix 143. In an aspect, unicast BGP address prefixes 243 may be limited by availability and/or cost. The routing controller 250 may select which front-end devices 142 to associate with a unicast BGP address prefix. For example, the routing controller 250 may analyze a network topology of the WAN 240 to determine front-end devices 142 that may be associated with desirable (e.g., relatively lower latency or greater bandwidth) paths to the service 146 within the WAN 240. In some implementations, a unicast BGP address prefix may be re-used by front-end devices in geographically isolated regions of the WAN 140. For instance, if a front-end device 142*c* is located in a different region or country such that traffic from the ISP 122*b* is unlikely to be routed to the front-end device 142*c*, the front-end device 142*c* may also advertise the unicast BGP address prefix of 1.1.3/24 to establish a path in its respective region.

In an aspect, the advertisement of unicast BGP address prefixes may establish paths 260, 262. Unlike the case of the paths 150, 152 in FIG. 1, the routing controller 250 and/or the routing agent 230 may have greater control over the paths 260, 262. For example, the routing agent 230 may tunnel traffic for the service 146 to a respective front-end device 142 associated with a selected path. Although the ISPs 122 may be autonomous systems and select different routes over the Internet 220, the use of a unicast BGP address prefix may ensure traffic reaches a specific ingress point on the WAN 240. Moreover, the differentiation between the paths 260, 262 allows the routing agent 230 to measure the paths 260, 262. For example, the routing agent 230 may send ping packets to the service along each available path to determine a latency associated with each path. Once again, although the ISPs 122 may make different routing decisions, such decisions are likely to be relatively static and produce consistent path measurements.

The routing controller 250 may select a path (e.g., path 260, 262) within the WAN 240 for the service 146 for users of the partner network 210. The path 260, 262 includes a selected device of the plurality of front-end devices 142. For example, the routing controller 250 may select a path based on internal routing preferences of the WAN 240. For instance, the routing controller 250 may select a path that has a lowest latency or a greatest available bandwidth. In some implementations, the routing controller 250 may select the path based on the measurements 232 provided by the routing agent 230. In some implementations, the routing agent 230 may provide measurements 232 of the paths 260, 262 to the respective front-end device 142. Such measurements 232 may represent a portion of the path where the WAN 240 lacks direct control of routing. The routing controller 250 may perform measurements of various paths within the WAN 240. In some cases, the routing controller 250 may add a measurement within the WAN 240 from the front-end device 142 to the service 146 to the measurement 232 of the portion of the path outside of the WAN 240. In other implementations, the routing agent 230 may measure the total path 260, 262. Accordingly, the routing controller 250 may dynamically select a path between the partner network 210 and the service 146.

The routing controller 250 may control the routing agent 230 to use the selected path for traffic for the service 146. For example, the routing controller 250 may export a routing rule 252 to the routing agent 230. The routing rule 252 may specify the unicast address prefix 243 for the selected front-end device 142. The routing agent 230 may forward traffic for the service to the unicast address prefix based on the routing rule. For example, the routing agent 230 may encapsulate packets for the service within a packet for the unicast address prefix for the selected front-end device 142 based on the routing rule. The front-end device 142 may then decapsulate packets for the service from packets addressed to the unicast address prefix for the selected device based on the routing rule. As another example, the routing agent 230 may rewrite headers of packets for the service with the unicast address prefix for the selected device based on the routing rule. In some implementations, the header may include a port corresponding to an original address for the service. The front-end device 142 may then forward the data packets addressed to the unicast address prefix for the selected device 142 to the service 146 based on an original address within the WAN 240 according to the routing rule. The routing controller 250 may configure routing tables within the WAN 240 such that the front-end device 142 and other devices forward the packets to the service 146 along the selected path 260, 262. Accordingly, the routing controller 250 may have increased control over the path of packets for a service and thereby improve operation of the system. For instance, the routing controller 250 may select a path 260, 262 to meet a SLA for the service 146.

FIG. 3 is a diagram 300 of example components of the routing agent 230 and the routing controller 250 and communications there between. The routing agent 230 may include a measurement component 310, a control component 312, a forwarding component 314, and a monitoring component 316. The routing controller 250 may include an advertisement component 350, a path selection component 352, an external rule component 354 and an internal routing component 356.

The measurement component 310 may be configured to measure a plurality of paths to a service within the WAN 240. Each of the plurality of paths may be associated with one of a plurality of front-end devices 142 of the WAN 240 that are associated with respective unicast border gateway protocol address prefixes 243. In an aspect, the measurement component 310 may receive a list of the unicast border gateway protocol address prefixes 243 from the routing controller 250. In some implementations, where the routing agent 230 is connected to two or more ISPs 122, there may be multiple available paths to each of the front-end devices 142. For example, a path to edge device 142a using the unicast address prefix 243a and the first ISP 122a may be different than a path to edge device 142a using the unicast address prefix 243a and the second ISP 122b. The measurement component 310 may generate a measurement 232 for each potential path. The measurements 232 may include latency, delay, throughput, and/or devices traversed. In some implementations, the measurements 232 may include a trace route indicating one or more networks (e.g., ISPs 122) between the partner network 210 and the WAN 240.

The control component 312 may be configured to communicate with the routing controller 250. For example, the control component 312 may establish a session with the routing controller 250. In an aspect, the session may utilize an anycast BGP address prefix for reliability. The control component 312 may provide the measurements 232 to the routing controller 250 via the session. The control component 312 may receive the routing rule 252 from the routing controller 250 via the session.

The forwarding component 314 may be configured to forward data packets for the service 146 to the respective border gateway protocol address prefix 243 of the selected device 142 via the Internet 220. For example, the forwarding component 314 may be a router or a software routing stack. The forwarding component 314 may identify packets for the service 146. For instance, the forwarding component 314 may identify the packets based on a 5-tuple for each packet. The forwarding component 314 may tunnel the packets to the border gateway protocol address prefix 243. For instance, the forwarding component 314 may use encapsulation and/or header rewriting. In some implementations, the forwarding component 314 may select an ISP 122 to forward the packets. The selected ISP may be based on the routing rule 252. For instance, the routing controller 250 may determine the ISP 122 on the selected path 260, 262 based on the measurements 232.

The monitoring component 316 may monitor operation of the routing agent 230. For example, the monitoring component may collect statistics regarding traffic forwarded according to the routing rules. In some implementations, the monitoring component 316 may generate an operator dashboard that is viewable by an operator of the partner network 210. For example, the monitoring component 316 may include a user interface that allows a network operator to view the statistics. In some implementations, the network operator may configure the routing agent 230. For instance, the monitoring component 316 may allow the network operator to select which services 146 receive routing rules.

The advertisement component 350 may be configured to advertise a plurality of unicast border gateway protocol address prefixes 243 for a plurality of front-end devices 142 of the WAN 240. For example, the advertisement component 350 may control the plurality of front-end devices 142 to send advertisements 242 to connected ISPs 122. In some implementations, the advertisement component 350 may select the plurality of front-end devices 142 based on a network topology of the WAN 240. For example, the advertisement component 350 may allocate a limited number of unique unicast border gateway protocol address prefixes 243 among a larger number of front-end devices 142. In some implementations, the advertisement component 350 may select geographically distributed front-end devices. In some implementations, the advertisement component 350 may select front-end devices that are associated with different paths to a data center 144 or a service 146.

The path selection component 352 may be configured to select a path 260, 262 within the WAN 240 for a service 146 for users of the partner network 210. The path 260, 262 may include a selected device of the plurality of front-end devices 142. For example, in an implementation, the path selection component 352 may select a best path from any front-end device 142 associated with a unicast BGP address prefix 143 to the data center 144 hosting a service 146. For instance, the best path may be a lowest cost path, a path having the least load, a path having the most bandwidth, a path having the best performance (e.g., latency and jitter), or a best combination of such metrics. In other implementations, the path selection component 352 may receive the measurements 232 from the routing agent 230 and select a path based on the measurements 232. The use of the measurements 232 may advantageously account for the portion of the path 260, 262 over the Internet 220, which may be responsible for substantial latency. In an aspect, the path selection component 352 may be configured to select a best combination of an external portion of the path from the routing agent 230 to a front-end device 142 and an internal portion of the path from the front-end device 142 to the data center 144 or front-end device 142 hosting the service 146.

The external rule component 354 may be configured to export a routing rule 252 to the routing agent 230 within the partner network 210. The routing rule 252 may specify at least a unicast address prefix 243 for the selected device. Accordingly, the routing agent 230 may route traffic for the service 146 to the selected device. In some implementations, the routing rule 252 may specify particular tunneling settings or ISPs. For instance, the routing rule 252 may specify settings for encapsulation, header rewriting, or port forwarding.

The internal routing component 356 may be configured to control the selected front-end device 142 to receive data packets for the service 146 of the partner network 210 at the selected device. For instance, the internal routing component 356 may configure any packet processing (e.g., decapsulation or header rewriting) to be performed on the arriving data packets. The internal routing component 356 may configure routing tables at the front-end device 142 and each other device on the selected path to forward the data packets toward the service 146 along the selected path.

FIG. 4 is a schematic diagram of an example of a device 400 (e.g., a computing device) for communication between a partner network and a service hosted in a WAN connected to the partner network via an Internet. The device 400 may be implemented as one or more computing devices in the partner network 210. For instance, the device 400 may be implemented as an SD-WAN appliance 112. A plurality of user devices 104 may be configured to forward data packets to the device 400. For example, user devices 104 may be connected to the device 400 via a local area network (LAN) or virtual private network (VPN). In some implementations where the partner network 110 is a RAN, the user devices 104 may be connected via a UPF 106 according to a radio network specification. In some implementations, the UPF 106 may execute a software stack under the control of the WAN 240 (e.g., according to the radio network specification). In some implementations, the device 400 may be a user device 104.

In an example, device 400 can include a processor 402 and/or memory 404 configured to execute or store instructions or other parameters related to providing an operating system 406, which can execute one or more applications or processes, such as, but not limited to, the routing agent 230 for forwarding data packets to the WAN along a selected path. For example, processor 402 and memory 404 may be separate components communicatively coupled by a bus (e.g., on a motherboard or other portion of a computing device, on an integrated circuit, such as a system on a chip (SoC), etc.), components integrated within one another (e.g., processor 402 can include the memory 404 as an on-board component), and/or the like. Memory 404 may store instructions, parameters, data structures, etc. for use/execution by processor 402 to perform functions described herein.

In an example, the routing agent 230 may include the measurement component 310, the control component 312, and the forwarding component 314. The routing agent 230 may optionally include the monitoring component 316.

Figure 5:
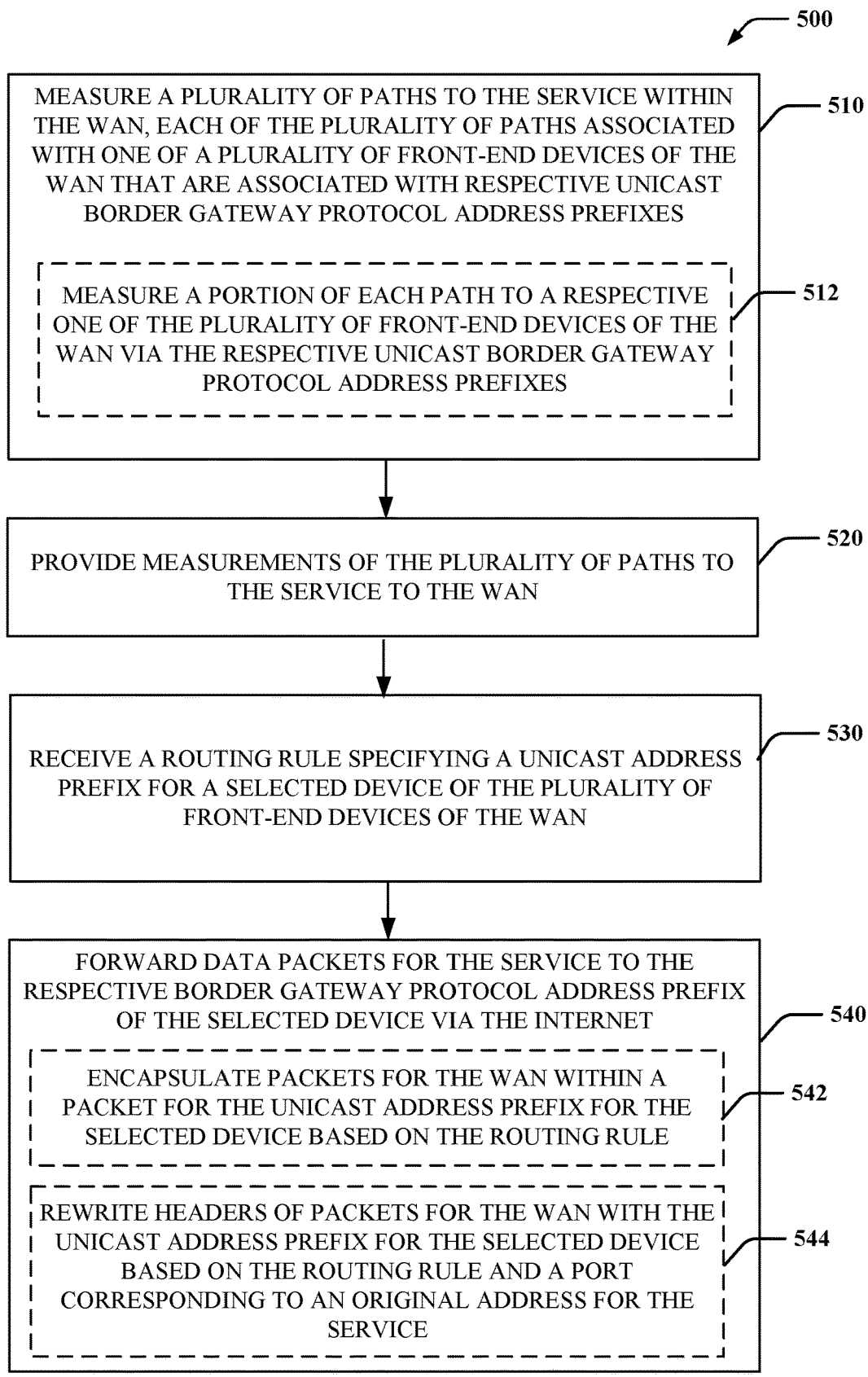
FIG. 5 is a flow diagram of an example of a method of routing traffic from a partner network to a WAN, in accordance with aspects described herein.

FIG. 5 is a flow diagram of an example of a method 500 for forwarding packets to a WAN 240 according to a path selected by the WAN 240. For example, the method 500 can be performed by a device 400 and/or one or more components thereof to measure potential paths and route the data packets along the selected path to a selected front-end device 142 of the WAN 240.

At block 510, the method 500 includes measuring a plurality of paths to the service within the WAN, each of the plurality of paths associated with one of a plurality of front-end devices of the WAN that are associated with respective unicast BGP address prefixes. In an example, the routing agent 230 and/or the measurement component 310, e.g., in conjunction with processor 402, memory 404, and operating system 406, can measure the plurality of paths 260, 262 to the service 146 within the WAN 240. Each of the plurality of paths 260, 262 is associated with one of a plurality of front-end devices 142a, 142b of the WAN 240 that are associated with respective unicast BGP address prefixes 143a, 143b. In some implementations, the measurements include latency, delay, throughput, or devices traversed. In some implementations, the measurements include a trace route indicating one or more networks between the partner network and the WAN. In some implementations, at sub-block 512, the block 510 may measuring a portion of each path 260, 262 to a respective one of the plurality of front-end devices 142a, 142b, of the WAN via the respective unicast border gateway protocol address prefixes 143a, 143b. That is, the measurement component 310 may measure a portion of the paths 260, 262 that is external to the WAN 240. In such implementations, the measurements may not depend on internal routing within the WAN 240. The WAN 240 may determine the portion of the path within the WAN 240 based on internal measurements, a network topology, and/or costs. In some other implementations, the block 510 may include measuring a full path between the routing agent 230 and the service 146. Additionally, the measurement component 310 may continue to perform measurements after a path is selected, for example, to determine whether to update the path.

At block 520, the method 500 includes providing measurements of the plurality of paths to the service to the WAN. In an example, the control component 312 and/or the routing agent 230, e.g., in conjunction with processor 402, memory 404, and operating system 406, can provide the measurements 232 of the plurality of paths 260, 262 to the service 146 to the WAN 240. For instance, the control component 312 may communicate the measurements 232 to the routing controller 250. In some implementations, the control component 312 may provide the measurements in response to a request from the routing controller 250.

At block 530, the method 500 includes receiving a routing rule specifying a unicast address prefix for a selected device of the plurality of front-end devices of the WAN. In an example, the control component 312 and/or the routing agent 230, e.g., in conjunction with processor 402, memory 404, and operating system 406, can receive the routing rule 252 specifying the unicast address prefix 243 (e.g., prefix 243a) for a selected device (e.g., front-end device 142a) of the plurality of front-end devices 142 of the WAN 240.

At block 540, the method 500 includes forwarding data packets for the service to the respective border gateway protocol address prefix of the selected device via the Internet. In an example, the forwarding component 314 and/or the routing agent 230, e.g., in conjunction with processor 402, memory 404, and operating system 406, can forward the data packets 320 for the service 146 to the respective border gateway protocol address prefix 243a of the selected device 142a via the Internet 220. For instance, the forwarding component 314 may establish a tunnel to the selected device 142a via the Internet 220. In some implementations, at sub-block 542, the block 540 may include encapsulating packets for the service within a packet for the unicast address prefix for the selected device based on the routing rule. In some implementations, at sub-block 544, the block 540 may include rewriting headers of packets for the service with the unicast address prefix for the selected device based on the routing rule and a port corresponding to an original address for the service. For example, the tunneling technique may depend on the capabilities and/or configuration of the selected front-end device 142.

Figure 6:
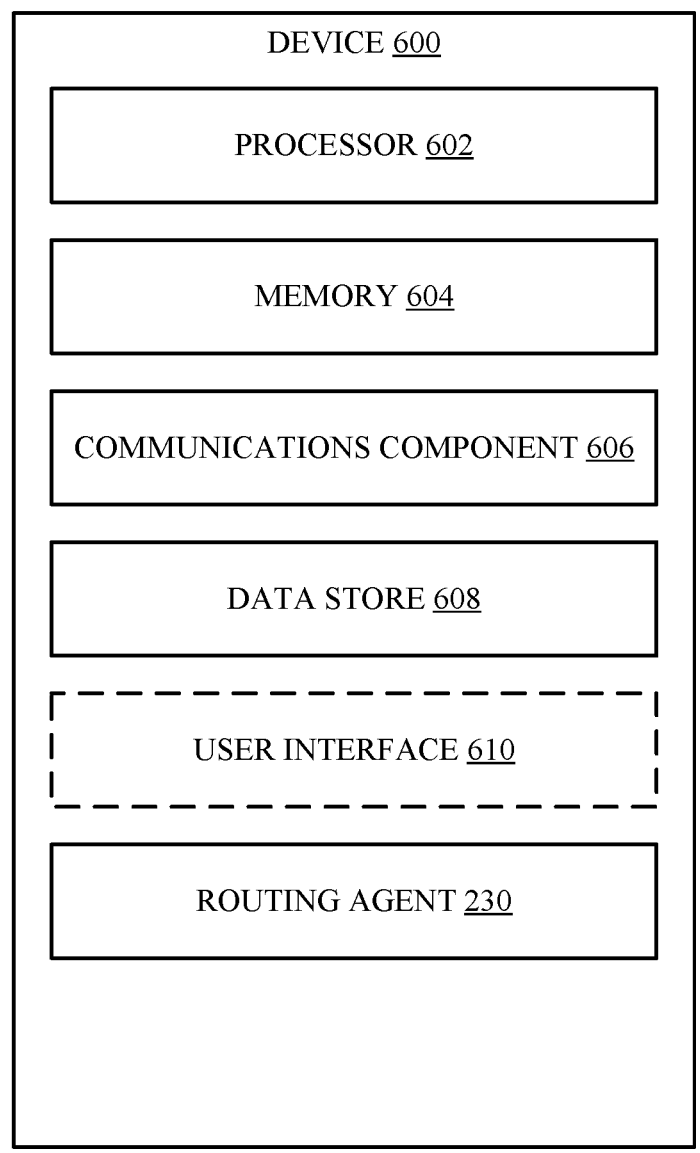
FIG. 6 is a schematic diagram of an example of a device for performing functions of a routing agent described herein, in accordance with aspects described herein.

FIG. 6 illustrates an example of a device 600 including additional optional component details as those shown in FIG. 4. In one aspect, device 600 may include processor 602, which may be similar to processor 402 for carrying out processing functions associated with one or more of components and functions described herein. Processor 602 can include a single or multiple set of processors or multi-core processors. Moreover, processor 602 can be implemented as an integrated processing system and/or a distributed processing system.

Device 600 may further include memory 604, which may be similar to memory 404 such as for storing local versions of operating systems (or components thereof) and/or applications being executed by processor 602, such as the routing agent 230, the measurement component 310, the control component 312, the forwarding component 314, the monitoring component 316, etc. Memory 604 can include a type of memory usable by a computer, such as random access memory (RAM), read only memory (ROM), tapes, magnetic discs, optical discs, volatile memory, non-volatile memory, and any combination thereof.

Further, device 600 may include a communications component 606 that provides for establishing and maintaining communications with one or more other devices, parties, entities, etc. utilizing hardware, software, and services as described herein. Communications component 606 may carry communications between components on device 600, as well as between device 600 and external devices, such as devices located across a communications network and/or devices serially or locally connected to device 600. For example, communications component 606 may include one or more buses, and may further include transmit chain components and receive chain components associated with a wireless or wired transmitter and receiver, respectively, operable for interfacing with external devices.

Additionally, device 600 may include a data store 608, which can be any suitable combination of hardware and/or software, that provides for mass storage of information, databases, and programs employed in connection with aspects described herein. For example, data store 608 may be or may include a data repository for operating systems (or components thereof), applications, related parameters, etc. not currently being executed by processor 602. In addition, data store 608 may be a data repository for the routing agent 230.

Device 600 may optionally include a user interface component 610 operable to receive inputs from a user of device 600 and further operable to generate outputs for presentation to the user. User interface component 610 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 610 may include one or more output devices, including but not limited to a display, a speaker, a haptic feedback mechanism, a printer, any other mechanism capable of presenting an output to a user, or any combination thereof.

Device 600 may additionally include a routing agent 230 for communication between a partner network and a service hosted in a WAN connected to the partner network via an Internet, measurement component 310 for measuring a plurality of paths to the service within the WAN, control component 312 for providing measurements of the plurality of paths to the service to the WAN and receiving a routing rule, and a forwarding component 314 for forwarding data packets for the service to the respective border gateway protocol address prefix of the selected device via the Internet, etc.

Figure 7:
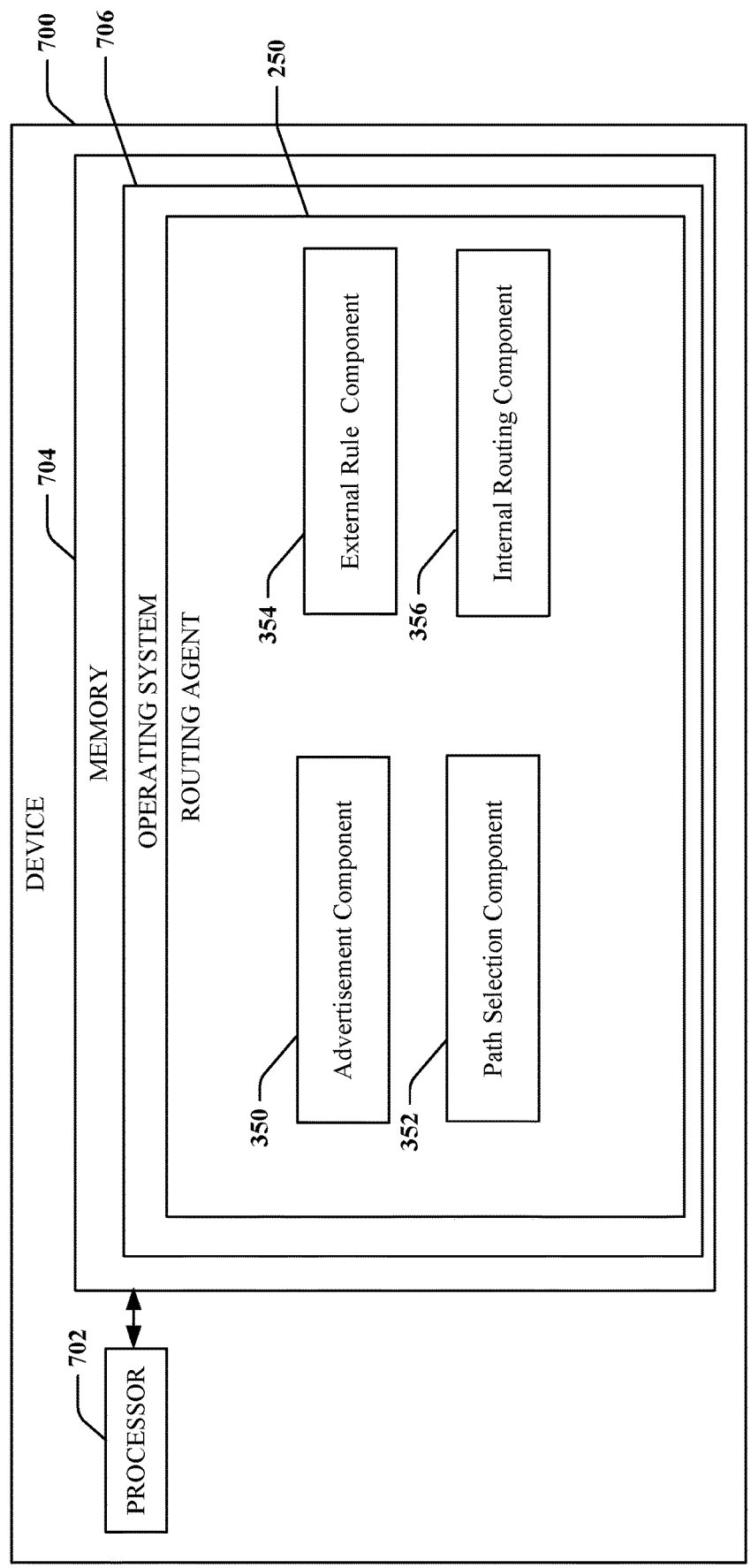
FIG. 7 is a schematic diagram of an example of a device for controlling communications between a partner network and a WAN, in accordance with aspects described herein.

FIG. 7 is a schematic diagram of an example of a device 700 (e.g., a computing device) for managing connectivity between a partner network and a WAN. The device 700 may be implemented as one or more computing devices in the WAN 240. For example, the device 700 may be implemented as a server at a data center 144.

In an example, device 700 can include a processor 702 and/or memory 704 configured to execute or store instructions or other parameters related to providing an operating system 706, which can execute one or more applications or processes, such as, but not limited to, the routing controller 250 for configuring routing between the partner network 210 and a data center 144 hosting the service 146. For example, processor 702 and memory 704 may be separate components communicatively coupled by a bus (e.g., on a motherboard or other portion of a computing device, on an integrated circuit, such as a system on a chip (SoC), etc.), components integrated within one another (e.g., processor 702 can include the memory 704 as an on-board component), and/or the like. Memory 704 may store instructions, parameters, data structures, etc. for use/execution by processor 702 to perform functions described herein.

In an example, the routing agent 230 may include the advertisement component 350, the path selection component 352, the external rule component 354, and the internal routing component 356.

Figure 8:
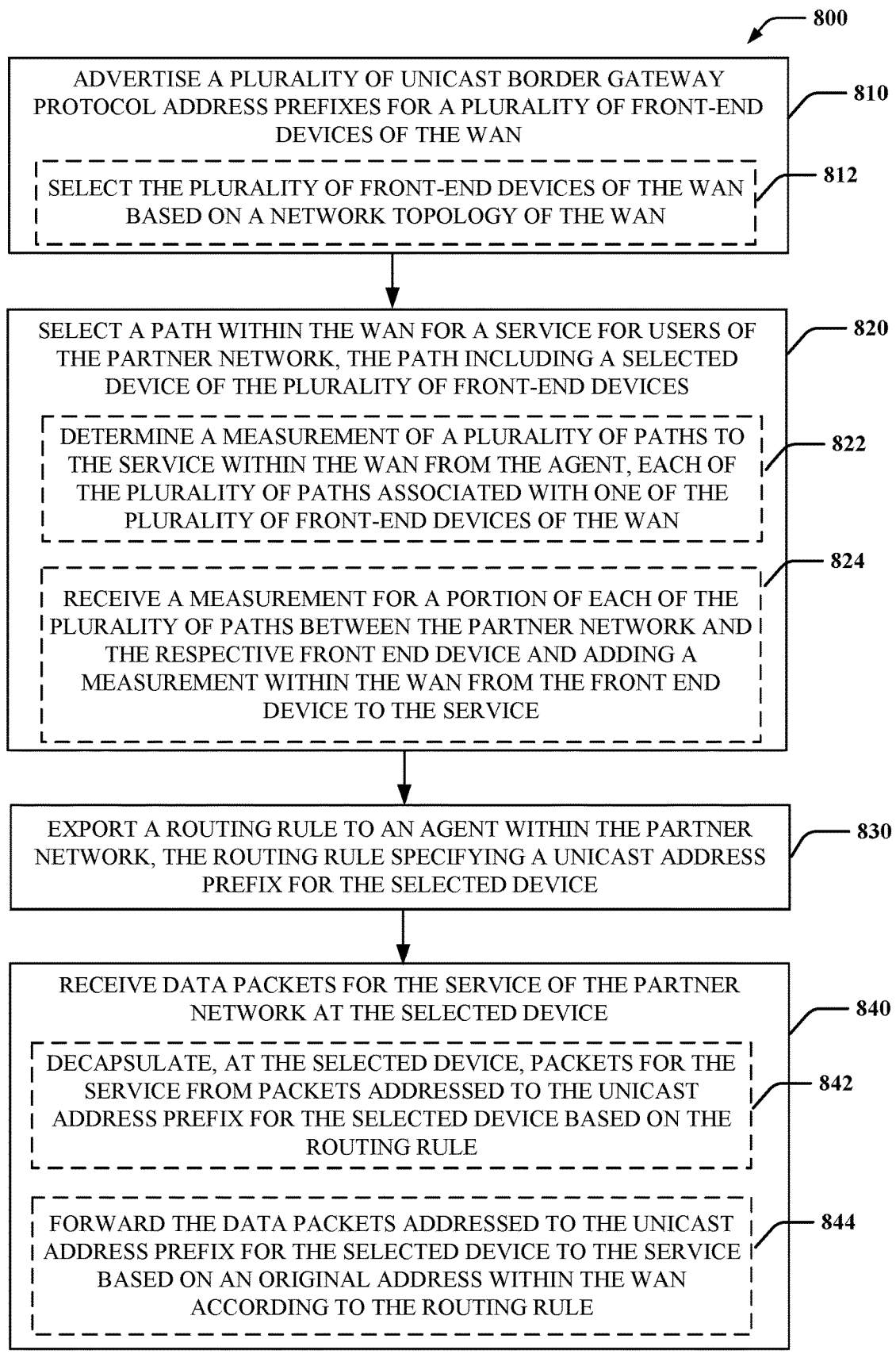
FIG. 8 is a flow diagram of an example of a method of controlling communications between a partner network and a WAN, in accordance with aspects described herein.

FIG. 8 is a flow diagram of an example of a method 800 for managing connectivity between a partner network and a WAN. For example, the method 800 can be performed by a device 700 and/or one or more components thereof to establish paths between the partner network and the WAN, and select a path for traffic for a service hosted in the WAN for the partner network.

At block 810, the method 800 includes advertising a plurality of unicast border gateway protocol address prefixes for a plurality of front-end devices of the WAN. In an example, the routing controller 250 and/or the advertisement component 350, e.g., in conjunction with processor 702, memory 704, and operating system 706, can advertise a plurality of unicast border gateway protocol address prefixes 243 for a plurality of front-end devices 142 of the WAN 240. In some implementations, each of the plurality of unicast border gateway protocol address prefixes 243 identify a respective front-end device 142 at a point of presence (POP) or peering connection between the WAN 240 and an ISP 122. In some implementations, at sub-block 812, the block 810 may optionally include selecting the plurality of front-end devices of the WAN based on a network topology of the WAN.

At block 820, the method 800 includes selecting a path within the WAN for a service for users of the partner network, the path including a selected device of the plurality of front-end devices. In an example, the path selection component 352 and/or the routing controller 250, e.g., in conjunction with processor 702, memory 704, and operating system 706, can select a path 260, 262 within the WAN 240 for a service 146 for users of the partner network 210. The path 260, 262 includes a selected device (e.g., front-end device 142a) of the plurality of front-end devices 142.

In some implementations, at sub-block 822, the block 820 optionally includes determining measurements of a plurality of paths 260, 262 to the service 146 within the WAN 240 from the agent 230, each of the plurality of paths 260, 262 associated with one of the plurality of front-end devices 142 of the WAN 240. For example, the path selection component 352 may receive the measurements 232 of the plurality of paths from the agent 230 (e.g., from measurement component 310). As another example, the path selection component 352 may receive the measurements of the plurality of paths from an external service such as an application monitoring service. In some implementations, at sub-block 824, the block 820 optionally includes receiving a measurement 232 for a portion of each of the plurality of paths 260, 262 between the partner network 210 and the respective front-end device 142 and adding a measurement within the WAN from the front-end device 142 to the service 146. For example, the path selection component 352 may receive the measurements 232 of portion of each of the plurality of paths from the agent 230 or the external service. In some implementations, selecting the path within the WAN 240 is based on a load on the path 260, 262.

At block 830, the method 800 includes exporting a routing rule to an agent within the partner network, the routing rule specifying a unicast address prefix for the selected device. In an example, the external rule component 354 and/or the routing controller 250, e.g., in conjunction with processor 702, memory 704, and operating system 706, can export a routing rule 252 to the agent 230 within the partner network 210, the routing rule 252 specifying a unicast address prefix 243 for the selected device. In some implementations, the agent 230 within the partner network 210 is located at a software defined wide area networking (SD-WAN) appliance 112. In some implementations, the agent 230 within the partner network 210 is an application controlled by the WAN 240. For example, the application may be executed by a user device 104 or a UPF 106 under control of the WAN 240.

At block 840, the method 800 includes receiving data packets for the service of the partner network at the selected device. In an example, the internal routing component 356 and/or the routing controller 250, e.g., in conjunction with processor 702, memory 704, and operating system 706, can configure the front-end device 142a to receive the data packets 320 for the service 146 of the partner network 210 at the selected device 142a. The front-end device 142a may receive the data packets 320 for the service 146 of the partner network 210. In some implementations, at sub-block 842, the block 840 may optionally include decapsulating, at the selected device, packets for the service from packets addressed to the unicast address prefix for the selected device based on the routing rule. In some implementations, at sub-block 844, the block 840 may optionally include forwarding the data packets addressed to the unicast address prefix for the selected device to the service based on an original address within the WAN according to the routing rule.

Figure 9:
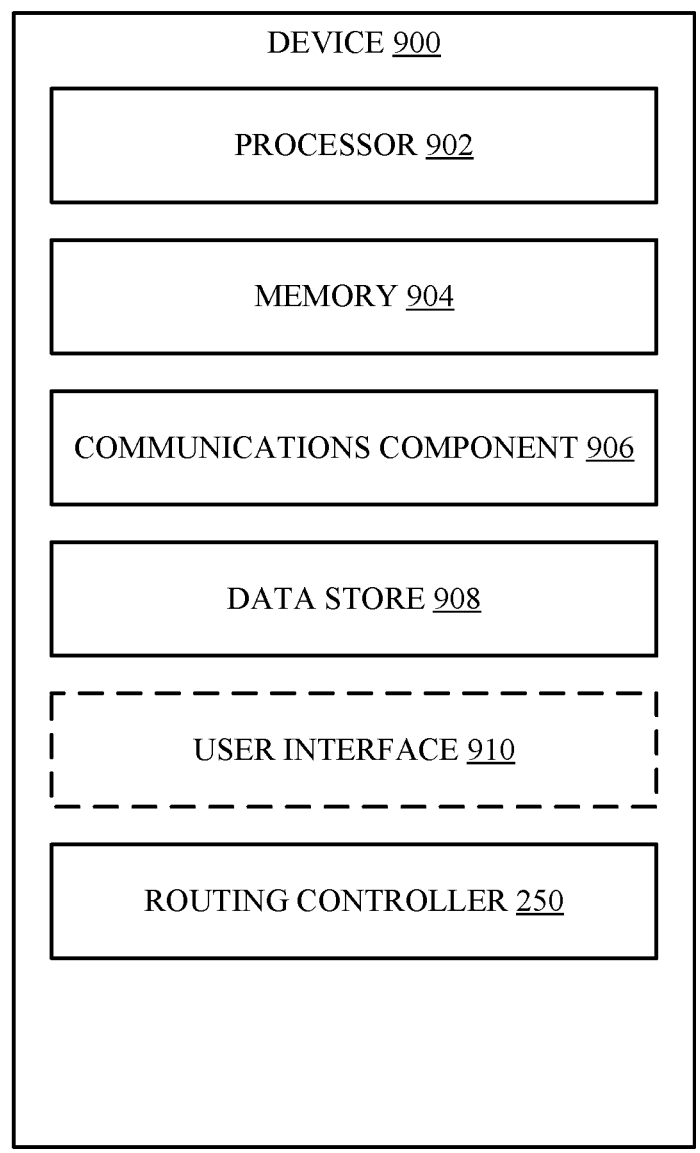
FIG. 9 is a schematic diagram of an example of a device for performing functions of a routing controller described herein, in accordance with aspects described herein.

FIG. 9 illustrates an example of a device 900 including additional optional component details as those shown in FIG. 7. In one aspect, device 900 may include processor 902, which may be similar to processor 702 for carrying out processing functions associated with one or more of components and functions described herein. Processor 902 can include a single or multiple set of processors or multi-core processors. Moreover, processor 902 can be implemented as an integrated processing system and/or a distributed processing system.

Device 900 may further include memory 904, which may be similar to memory 704 such as for storing local versions of operating systems (or components thereof) and/or applications being executed by processor 902, such as the routing controller 250, the advertisement component 350, the path selection component 352, the external rule component 354, and the internal routing component 356, etc. Memory 904 can include a type of memory usable by a computer, such as random access memory (RAM), read only memory (ROM), tapes, magnetic discs, optical discs, volatile memory, non-volatile memory, and any combination thereof.

Further, device 900 may include a communications component 906 that provides for establishing and maintaining communications with one or more other devices, parties, entities, etc. utilizing hardware, software, and services as described herein. Communications component 906 may carry communications between components on device 900, as well as between device 900 and external devices, such as devices located across a communications network and/or devices serially or locally connected to device 900. For example, communications component 906 may include one or more buses, and may further include transmit chain components and receive chain components associated with a wireless or wired transmitter and receiver, respectively, operable for interfacing with external devices.

Additionally, device 900 may include a data store 908, which can be any suitable combination of hardware and/or software, that provides for mass storage of information, databases, and programs employed in connection with aspects described herein. For example, data store 908 may be or may include a data repository for operating systems (or components thereof), applications, related parameters, etc. not currently being executed by processor 902. In addition, data store 908 may be a data repository for the routing controller 250.

Device 900 may optionally include a user interface component 910 operable to receive inputs from a user of device 900 and further operable to generate outputs for presentation to the user. User interface component 910 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 910 may include one or more output devices, including but not limited to a display, a speaker, a haptic feedback mechanism, a printer, any other mechanism capable of presenting an output to a user, or any combination thereof.

Device 900 may additionally include a routing controller 250 for managing connectivity between a partner network and a WAN, an advertisement component 350 for advertising a plurality of unicast border gateway protocol address prefixes for a plurality of front-end devices of the WAN, a path selection component 352 for selecting a path within the WAN for a service for users of the partner network, an external rule component for exporting a routing rule to an agent within the partner network, an internal routing component 356 for receiving data packets for the service of the partner network at the selected device, etc.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for managing connectivity between a partner network and a wide-area network (WAN), comprising:
 a memory storing one or more instructions for managing the WAN; and
 at least one processor coupled to the memory and configured to execute the instructions, wherein the at least one processor is configured to:
  advertise a plurality of unicast border gateway protocol address prefixes for a plurality of front-end devices of the WAN;
  select a path within the WAN for a service that is hosted in the WAN for users of the partner network, the path including a selected device of the plurality of front-end devices and a device within the WAN hosting the service;
  export a routing rule to an agent within the partner network, the routing rule specifying a unicast address prefix for the selected device;
  configure the selected device to receive data packets for the service that is hosted in the WAN from the users of the partner network; and
  configure the selected device to decapsulate packets for the service from packets addressed to the unicast address prefix for the selected device based on the routing rule.

2. The apparatus of claim 1, wherein each of the plurality of unicast border gateway protocol address prefixes identify a respective front-end device at a point of presence (POP) or peering connection between the WAN and an Internet service provider (ISP).

3. The apparatus of claim 1, wherein the at least one processor is configured to determine a measurement of a plurality of paths to the service within the WAN from the agent, each of the plurality of paths associated with one of the plurality of front-end devices of the WAN.

4. The apparatus of claim 3, wherein the at least one processor is configured to receive a measurement for a portion of each of the plurality of paths between the partner network and the respective front-end device and add a measurement within the WAN from the front-end device to the service.

5. The apparatus of claim 1, wherein the at least one processor is configured to select the path within the WAN based on a load on the path.

6. The apparatus of claim 1, wherein the agent within the partner network is located at a software defined wide area networking (SD-WAN) appliance.

7. The apparatus of claim 1, wherein the agent within the partner network is an application controlled by the WAN.

8. The apparatus of claim 1, wherein the at least one processor is configured to select the plurality of front-end devices of the WAN based on a network topology of the WAN.

9. The apparatus of claim 1, wherein the at least one processor is configured to configure the selected device to forward the data packets addressed to the unicast address prefix for the selected device to the service based on an original address within the WAN according to the routing rule.

10. The apparatus of claim 1, wherein the at least one processor is configured to advertise a common anycast border gateway protocol address prefix for the plurality of front-end devices of the WAN, wherein the common anycast border gateway protocol address prefix is less specific than the plurality of unicast border gateway protocol address prefixes.

11. A method of managing connectivity between a partner network and a wide-area network (WAN), comprising:
   advertising a plurality of unicast border gateway protocol address prefixes for a plurality of front-end devices of the WAN;
   selecting a path within the WAN for a service that is hosted in the WAN for users of the partner network, the path including a selected device of the plurality of front-end devices and a device within the WAN hosting the service;
   exporting a routing rule to an agent within the partner network, the routing rule specifying a unicast address prefix for the selected device;
   configure the selected device to decapsulate packets for the service from packets addressed to the unicast address prefix for the selected device based on the routing rule; and
   receiving data packets for the service that is hosted in the WAN from the users of the partner network at the selected device.

12. The method of claim 11, wherein each of the plurality of unicast border gateway protocol address prefixes identify a respective front-end device at a point of presence (POP) or peering connection between the WAN and an Internet service provider (ISP).

13. The method of claim 11, wherein selecting the path within the WAN for the service comprises determining a measurement of a plurality of paths to the service within the WAN from the agent, each of the plurality of paths associated with one of the plurality of front-end devices of the WAN.

14. The method of claim 13, wherein determining the measurement of a plurality of paths to the service within the WAN from the agent comprises receiving a measurement for a portion of each of the plurality of paths between the partner network and the respective front-end device and adding a measurement within the WAN from the front-end device to the service.

15. The method of claim 11, wherein selecting the path within the WAN is based on a load on the path.

16. The method of claim 11, wherein the agent within the partner network is located at a software defined wide area networking (SD-WAN) appliance.

17. The method of claim 11, wherein the agent within the partner network is an application controlled by the WAN.

18. The method of claim 11, wherein advertising the plurality of unicast border gateway protocol address prefixes for the plurality of front-end devices of the WAN comprises selecting the plurality of front-end devices of the WAN based on a network topology of the WAN.

19. The method of claim 11, wherein receiving the data packets for the service of the partner network at the selected device comprises decapsulating, at the selected device, packets for the service from packets addressed to the unicast address prefix for the selected device based on the routing rule.

20. The method of claim 11, wherein receiving the data packets for the service of the partner network at the selected device comprises forwarding the data packets addressed to the unicast address prefix for the selected device to the service based on an original address within the WAN according to the routing rule.

21. The method of claim 11, further comprising advertising a common anycast border gateway protocol address prefix for the plurality of front-end devices of the WAN, wherein the common anycast border gateway protocol address prefix is less specific than the plurality of unicast border gateway protocol address prefixes.

22. An apparatus for managing connectivity between a partner network and a wide-area network (WAN), comprising:
   a memory storing one or more instructions for managing the WAN; and
   at least one processor coupled to the memory and configured to execute the instructions, wherein the at least one processor is configured to:
      advertise a plurality of unicast border gateway protocol address prefixes for a plurality of front-end devices of the WAN;
      determine a measurement of a plurality of paths to a service within the WAN from an agent, each of the plurality of paths associated with one of the plurality of front-end devices of the WAN;
      receive a measurement for a portion of each of the plurality of paths between the partner network and the respective front-end device and add a measurement within the WAN from the front-end device to the service;
      select a path within the WAN for a service that is hosted in the WAN for users of the partner network, the path including a selected device of the plurality of front-end devices and a device within the WAN hosting the service;
      export a routing rule to the agent within the partner network, the routing rule specifying a unicast address prefix for the selected device; and
      configure the selected device to receive data packets for the service that is hosted in the WAN from the users of the partner network.

* * * * *